(12) United States Patent
Watanabe et al.

(10) Patent No.: US 11,841,267 B2
(45) Date of Patent: Dec. 12, 2023

(54) ENERGY MEASURING APPARATUS AND EXCIMER LASER APPARATUS

(71) Applicant: Gigaphoton Inc., Tochigi (JP)

(72) Inventors: Yosuke Watanabe, Oyama (JP); Masato Moriya, Oyama (JP)

(73) Assignee: Gigaphoton Inc., Tochigi (JP)

( * ) Notice: Subject to any disclaimer, the term of this patent is extended or adjusted under 35 U.S.C. 154(b) by 581 days.

(21) Appl. No.: 17/113,759

(22) Filed: Dec. 7, 2020

(65) Prior Publication Data

US 2021/0116294 A1 Apr. 22, 2021

Related U.S. Application Data

(63) Continuation of application No. PCT/JP2018/025567, filed on Jul. 5, 2018.

(51) Int. Cl.
| | | |
|---|---|---|
| G01J 1/04 | (2006.01) | |
| G01J 1/42 | (2006.01) | |
| G02B 27/28 | (2006.01) | |
| H01S 3/00 | (2006.01) | |
| H01S 3/225 | (2006.01) | |

(52) U.S. Cl.
CPC .......... *G01J 1/0414* (2013.01); *G01J 1/0429* (2013.01); *G01J 1/4257* (2013.01); *G02B 27/283* (2013.01); *H01S 3/0014* (2013.01); *H01S 3/225* (2013.01)

(58) Field of Classification Search
CPC .. A47L 15/4297; A47L 2401/10; A47L 15/46; D06F 34/22; G01N 21/534; G01N 21/59; G01N 21/01; G01N 21/55; G01N 2021/0112; G01N 2021/555; G01N 2021/558; G01N 21/5907; G01N 15/06

USPC ......................................................... 356/364
See application file for complete search history.

(56) References Cited

U.S. PATENT DOCUMENTS

| | | |
|---|---|---|
| 2013/0050702 A1 | 2/2013 | Li et al. |
| 2013/0070234 A1 | 3/2013 | Li et al. |
| 2015/0139258 A1 | 5/2015 | Tsushima et al. |
| 2017/0222391 A1 | 8/2017 | Moriya et al. |
| 2018/0017875 A1 | 1/2018 | Bibby et al. |

(Continued)

FOREIGN PATENT DOCUMENTS

| | | |
|---|---|---|
| CN | 102269622 A | 12/2011 |
| CN | 105006728 A | 10/2015 |
| JP | S63-272087 A | 11/1988 |

(Continued)

OTHER PUBLICATIONS

International Search Report issued in PCT/JP2018/025567; dated Sep. 18, 2018.

(Continued)

*Primary Examiner* — Md M Rahman
(74) *Attorney, Agent, or Firm* — Studebaker & Brackett PC

(57) ABSTRACT

An energy measuring apparatus according to one aspect of the present disclosure includes a first beam splitter, a second beam splitter, a third beam splitter, and a fourth beam splitter, which sequentially reflect part of a main beam and input the beam to an energy sensor. The first beam splitter, the second beam splitter, the third beam splitter, and the fourth beam splitter are each arranged to have such an incident angle and a folding direction of an optical path as to suppress a change in detection value of the energy sensor due to a change in incident angle and a change in polarization purity of the main beam.

20 Claims, 14 Drawing Sheets

(56) References Cited

U.S. PATENT DOCUMENTS

2019/0033133 A1   1/2019  Moriya
2019/0107438 A1   4/2019  Moriya

FOREIGN PATENT DOCUMENTS

| | | |
|---|---|---|
| JP | S63-305577 A | 12/1988 |
| JP | H04-111370 A | 4/1992 |
| JP | H11-201869 A | 7/1999 |
| JP | 2000-150998 A | 5/2000 |
| JP | 2001-156374 A | 6/2001 |
| WO | 2014017562 A1 | 1/2014 |
| WO | 2016084755 A1 | 6/2016 |
| WO | 2017199395 A1 | 11/2017 |
| WO | 2018016066 A1 | 1/2018 |

OTHER PUBLICATIONS

International Preliminary Report on Patentability and Written Opinion issued in PCT/JP2018/025567; dated Jan. 5, 2021.
An Office Action mailed by China National Intellectual Property Administration dated May 25, 2023, which corresponds to Chinese Patent Application No. 201880093960.3 and is related to U.S. Appl. No. 17/113,759; with English language translation.

ENERGY MEASURING APPARATUS AND EXCIMER LASER APPARATUS

CROSS-REFERENCE TO RELATED APPLICATIONS

The present application is a continuation application of International Application No. PCT/JP2018/025567, filed on Jul. 5, 2018, the entire contents of which are hereby incorporated by reference.

BACKGROUND

1. Technical Field

The present disclosure relates to an energy measuring apparatus and an excimer laser apparatus.

2. Related Art

Improvement in resolution of semiconductor exposure apparatuses (hereinafter simply referred to as "exposure apparatuses") has been desired due to miniaturization and high integration of semiconductor integrated circuits. For this purpose, exposure light sources configured to output light with shorter wavelengths have been developed. As the exposure light source, a gas laser apparatus is used in place of a conventional mercury lamp. For example, as a gas laser apparatus for exposure, a KrF excimer laser apparatus configured to output ultraviolet light with a wavelength of 248 nm and an ArF excimer laser apparatus configured to output ultraviolet light with a wavelength of 193 nm are used.

As present exposure technology, immersion exposure is practically used. In the immersion exposure, a gap between a projection lens of an exposure apparatus and a wafer is filled with a liquid, and a refractive index of the gap is changed to reduce an apparent wavelength of light from an exposure light source. When the immersion exposure is performed using the ArF excimer laser apparatus as the exposure light source, the wafer is irradiated with ultraviolet light with a wavelength of 134 nm in water. This technology is referred to as ArF immersion exposure (also referred to as ArF immersion lithography).

The KrF excimer laser apparatus and the ArF excimer laser apparatus have a large spectral line width of about 350 to 400 pm in natural oscillation. Thus, chromatic aberration of a laser beam (ultraviolet light), which is reduced and projected on a wafer by a projection lens of an exposure apparatus, occurs to reduce resolution. Then, a spectral line width (also referred to as a spectral width) of a laser beam output from the gas laser apparatus needs to be narrowed to the extent that the chromatic aberration can be ignored. For this purpose, a line narrow module (LNM) having a line narrowing element is provided in a laser resonator of the gas laser apparatus to narrow the spectrum width. The line narrowing element may be an etalon, a grating, or the like. A laser apparatus with such a narrowed spectrum width is referred to as a line narrowing laser apparatus.

An excimer laser beam has a pulse width of about several tens of ns and a short wavelength of 248.4 nm or 193.4 nm, and is thus sometimes used for direct processing of polymeric material or glass material. An excimer laser beam having photon energy higher than binding energy can cut binding of the polymeric material. This is known to allow non-thermal processing and to provide a beautifully processed shape.

It is also known that the excimer laser beam is highly absorbed by glass and ceramics and thus can be used to process materials that are difficult to process with a visible laser beam and an infrared laser beam.

LIST OF DOCUMENTS

Patent Documents

Patent Document 1: International Publication No. 2014/017562
Patent Document 2: Japanese Unexamined Patent Application Publication No. H04-111370
Patent Document 3: International Publication No. 2016/084755

SUMMARY

An energy measuring apparatus for measuring energy of a laser beam output from a laser oscillator according to one aspect of the present disclosure includes a first beam splitter arranged at a first incident angle on a first optical path of the laser beam output from the laser oscillator, and configured to reflect part of the laser beam passing through the first optical path to create a second optical path; a second beam splitter arranged at a second incident angle on the second optical path, and configured to reflect part of the laser beam passing through the second optical path to create a third optical path; a third beam splitter arranged at a third incident angle on the third optical path, and configured to reflect part of the laser beam passing through the third optical path to create a fourth optical path; a fourth beam splitter arranged at a fourth incident angle on the fourth optical path, and configured to reflect part of the laser beam passing through the fourth optical path to create a fifth optical path; and an energy sensor arranged on the fifth optical path or an optical path posterior to the fifth optical path. The first incident angle is equal to the second incident angle, the third incident angle is equal to the fourth incident angle, a first incident plane of the first beam splitter and a second incident plane of the second beam splitter are on a first plane, a third incident plane of the third beam splitter and a fourth incident plane of the fourth beam splitter are on a second plane perpendicular to the first plane, the first beam splitter folds the first optical path in a first direction on the first plane to create the second optical path, the second beam splitter folds the second optical path in the first direction on the first plane to create the third optical path, the third beam splitter folds the third optical path in a second direction on the second plane to create the fourth optical path, and the fourth beam splitter folds the fourth optical path in the second direction on the second plane to create the fifth optical path.

An energy measuring apparatus for measuring energy of a laser beam output from a laser oscillator according to an aspect of the present disclosure includes a first beam splitter arranged at a first incident angle on a first optical path of the laser beam output from the laser oscillator, and configured to reflect part of the laser beam passing through the first optical path to create a second optical path; a second beam splitter arranged at a second incident angle on the second optical path, and configured to reflect part of the laser beam passing through the second optical path to create a third optical path; a third beam splitter arranged at a third incident angle on the third optical path, and configured to reflect part of the laser beam passing through the third optical path to create a fourth optical path; a fourth beam splitter arranged at a fourth incident angle on the fourth optical path, and configured to reflect part of the laser beam passing through the fourth optical path to create a fifth optical path; and an energy sensor arranged on the fifth optical path or an optical path posterior to the fifth optical path. The first incident angle is equal to the fourth incident angle, the second incident angle is equal to the third incident angle, a first incident plane of the first beam splitter and a fourth incident plane of the fourth beam splitter are parallel to a first plane, a second incident plane of the second beam splitter and a third incident plane of the third beam splitter are on a second plane perpendicular to the first plane, the first beam splitter folds the first optical path in a first direction on the first incident plane to create the second optical path, the second beam splitter folds the second optical path in a second direction on the second plane to create the third optical path, the third beam splitter folds the third optical path in the second direction on the second plane to create the fourth optical path, and the fourth beam splitter folds the fourth optical path in a direction opposite to the first direction on the fourth incident plane to create the fifth optical path.

BRIEF DESCRIPTION OF THE DRAWINGS

With reference to the accompanying drawings, some embodiments of the present disclosure will be described below merely by way of example.

DESCRIPTION OF EMBODIMENTS

Contents

Figure 1:
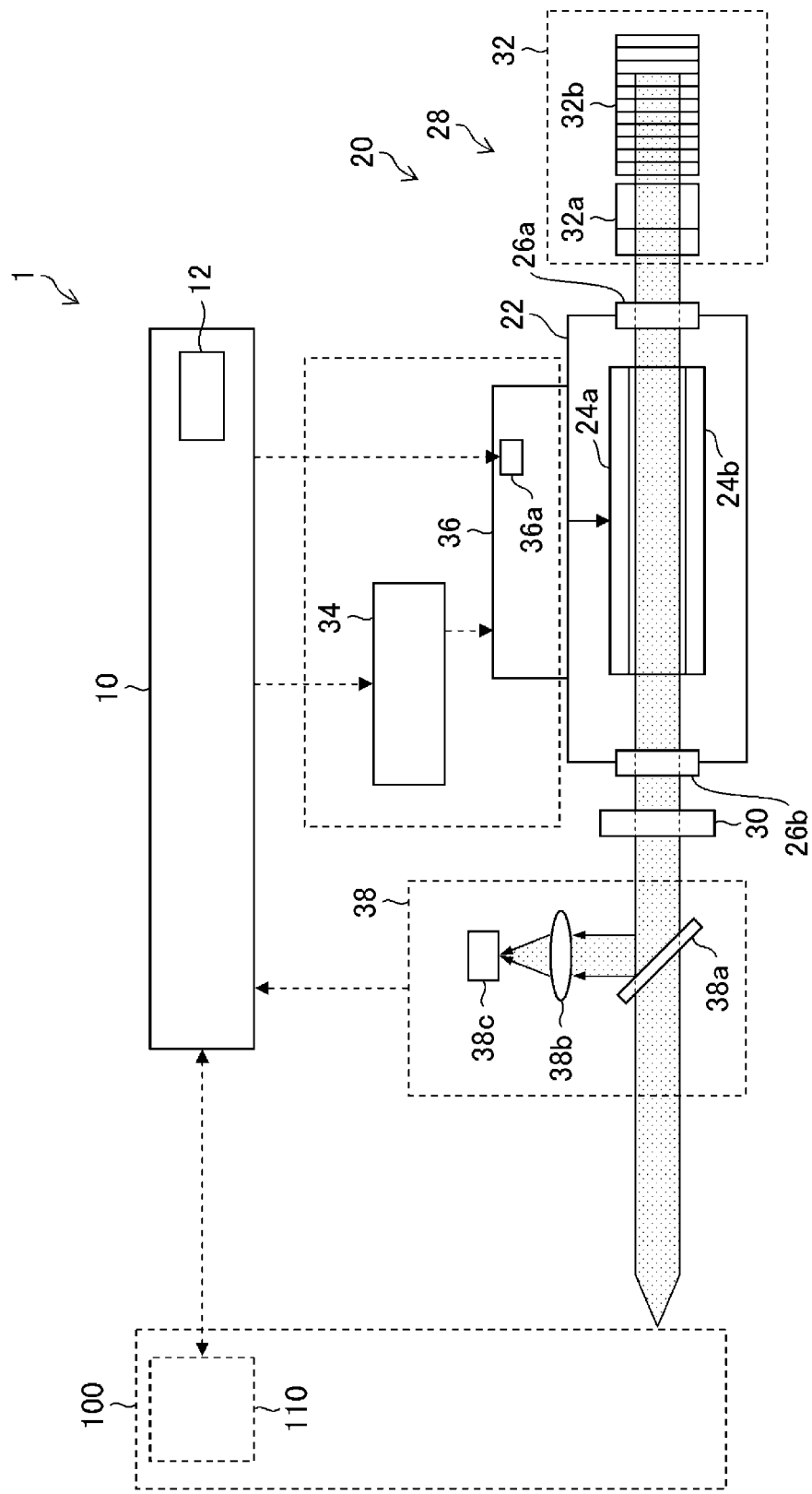
FIG. 1 schematically shows a configuration of an exemplary excimer laser apparatus.

1. Overall description of excimer laser apparatus
   1.1 Configuration
   1.2 Operation
2. Problem
3. Embodiment 1
   3.1 Configuration
   3.2 Operation
   3.3 Effect
4. Embodiment 2
   4.1 Configuration
   4.2 Operation
   4.3 Effect
5. Embodiment 3
   5.1 Configuration
   5.2 Operation
   5.3 Effect
6. Others Now, with reference to the drawings, embodiments of the present disclosure will be described in detail. The embodiments described below illustrate some examples of the present disclosure, and do not limit contents of the present disclosure. Also, all configurations and operations described in the embodiments are not necessarily essential as configurations and operations of the present disclosure. The same components are denoted by the same reference numerals, and overlapping descriptions are omitted.

1. Overall Description of Excimer Laser Apparatus 1.1 Configuration

FIG. 1 schematically shows a configuration of an exemplary excimer laser apparatus. The excimer laser apparatus 1 includes a control unit 10 and a laser oscillator system 20.

The control unit 10 transmits and receives various signals to and from an exposure apparatus controller 110 provided in the exposure apparatus 100. The control unit 10 controls the laser oscillator system 20. The control unit 10 includes a memory unit 12.

The laser oscillator system 20 (an example of a laser oscillator) includes a chamber 22, a laser resonator 28, a charger 34, a pulse power module (PPM) 36, and a power monitor 38.

The chamber 22 includes a pair of electrodes 24a, 24b and two windows 26a, 26b through which a laser beam passes. The chamber 22 is arranged on an optical path of the laser resonator 28.

The chamber 22 is filled with laser gas containing, for example, argon gas or krypton gas as rare gas, fluorine gas or chlorine gas as halogen gas, and neon gas or helium gas as buffer gas. The electrodes 24a, 24b excite the laser gas by electric discharge. A laser beam generated in the chamber 22 is emitted from the chamber 22 through the windows 26a, 26b.

The laser resonator 28 includes an output coupler (OC) 30 and a line narrow module (LNM) 32.

The output coupler 30 is a partially reflective mirror configured to transmit and output one part of the laser beam output from the chamber 22 and to reflect and return the other part of the laser beam into the chamber 22.

The line narrow module 32 includes a prism 32a and a grating 32b. The prism 32a expands a beam width. The grating 32b is provided in a Littrow arrangement with an incident angle being equal to a diffraction angle. The line narrow module 32 uses the prism 32a and the grating 32b to extract part of the laser beam with a specific wavelength, and narrows a spectrum line width of the laser beam.

A distance between the output coupler 30 and the grating 32b is set such that a laser beam with a predetermined wavelength output from the chamber 22 forms a stationary wave. The laser beam emitted from the chamber 22 reciprocates between the line narrow module 32 and the output coupler 30, and is amplified every time it passes between the electrodes 24a, 24b in the chamber 22. Part of the amplified laser beam is output as an output laser beam through the output coupler 30.

The charger 34 includes a capacitor connected to a power source device. The charger 34 holds electric energy for applying a high voltage between the electrodes 24a, 24b. The charger 34 is connected to a charging capacitor provided in the pulse power module 36.

The pulse power module 36 includes the charging capacitor (not shown) and a switch 36a controlled by the control unit 10. When the switch 36a is turned on, the pulse power module 36 generates a pulsed high voltage from the electric energy held by the charger 34, and applies the high voltage between the electrodes 24a, 24b.

The power monitor 38 is an energy measuring apparatus configured to measure energy of the laser beam output from the output coupler 30. The power monitor 38 includes a beam splitter 38a arranged on an optical path of the output laser beam, a light condensing lens 38b, and an optical sensor 38c.

The beam splitter 38a is an optical element configured to split an incident beam in two directions, and transmits one part of the incident beam and reflects the other part. The light condensing lens 38b condenses the laser beam, and may include a plurality of lenses. The optical sensor 38c is, for example, a photodiode, and outputs a detection signal in accordance with intensity of the incident laser beam.

1.2 Operation

The control unit 10 receives target pulse energy Et and an oscillation trigger signal transmitted from the exposure apparatus controller 110 provided in the exposure apparatus 100.

The control unit 10 sets, in accordance with the target pulse energy Et and the oscillation trigger signal received, a predetermined charging voltage (Vhv) of the charger 34 such that pulse energy of the laser beam reaches the target pulse energy Et. The control unit 10 operates the switch 36a of the pulse power module 36 synchronously with the oscillation trigger signal. The pulse power module 36 shortens pulses of the charging voltage applied by the charger 34 in accordance with the operation of the switch 36a, and applies a high voltage between the electrodes 24a, 24b.

When the high voltage is applied between the electrodes 24a, 24b, electric discharge occurs between the electrodes 24a, 24b. Energy of the electric discharge excites the laser gas in the chamber 22. The laser resonator 28 resonates, between the output coupler 30 and the line narrow module 32, a beam generated by the excited laser gas, thereby causing laser oscillation. The line narrow module 32 uses the prism 32a and the grating 32b to narrow the laser beam. The narrowed laser beam is output through the output coupler 30.

The laser beam output from the output coupler 30 enters the beam splitter 38a of the power monitor 38. The beam splitter 38a transmits one part of the laser beam having entered the beam splitter 38a and reflects the other part.

The laser beam having passed through the beam splitter 38a enters the exposure apparatus 100. On the other hand, the laser beam reflected by the beam splitter 38a passes through the light condensing lens 38b of the power monitor 38 and enters the optical sensor 38c. The power monitor 38 uses the optical sensor 38c to detect pulse energy E of the output laser beam.

The control unit 10 stores, in the memory unit 12, at least one of the charging voltage Vhv and the pulse energy E of the output laser beam. The control unit 10 may repeat the operations described above and store a charging voltage Vhv (Vhv1, Vhv2, . . . , Vhvn) and pulse energy E (E1, E2, . . . , En) of the output laser beam for each pulse.

The control unit 10 also performs feedback control to determine a charging voltage Vhv used for next laser oscillation in accordance with a difference $\Delta E$ between the target pulse energy Et and the energy E detected by the optical sensor 38c.

2. Problem

If a laser beam entering the optical sensor 38c is too intense, the optical sensor 38c rapidly deteriorates, decreasing the life of the power monitor 38.

Also, if at least one of an incident angle and polarization purity of the laser beam entering the power monitor 38 changes, an energy detection value changes even with constant actual pulse energy.

Figure 2:
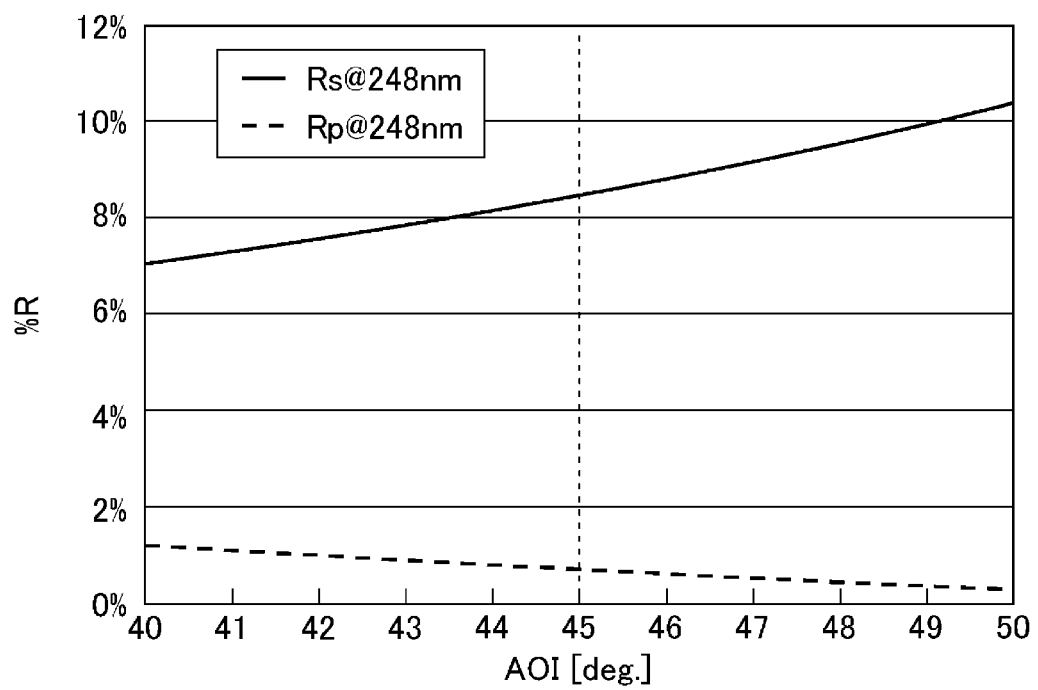
FIG. 2 shows a reflection characteristic of calcium fluoride.

FIG. 2 shows a relation between an incident angle and reflectance of a laser beam entering calcium fluoride ($CaF_2$) as an example of a material of the beam splitter 38a. In FIG. 2, the solid line shows reflectance for a S-polarized beam, and the dashed line shows reflectance for a P-polarized beam. FIG. 2 shows a relation at incident angles from 40 to 50 degrees of a KrF excimer laser beam with a wavelength of 248 nm.

As shown in FIG. 2, the reflectance for the P-polarized beam and the reflectance for the S-polarized beam of calcium fluoride are different at each incident angle. Thus, if the polarization purity of the laser beam entering the beam splitter 38a changes, an amount of light entering the optical sensor 38c changes.

The reflectance for the P-polarized beam of calcium fluoride decreases and the reflectance for the S-polarized beam of calcium fluoride increases with increasing incident angle. Thus, if the incident angle of the laser beam entering the beam splitter 38a changes, an amount of light entering the optical sensor 38c changes.

Here, calcium fluoride has been described, but sapphire and synthetic quartz also have the same property.

3. Embodiment 1

3.1 Configuration

Figure 3:
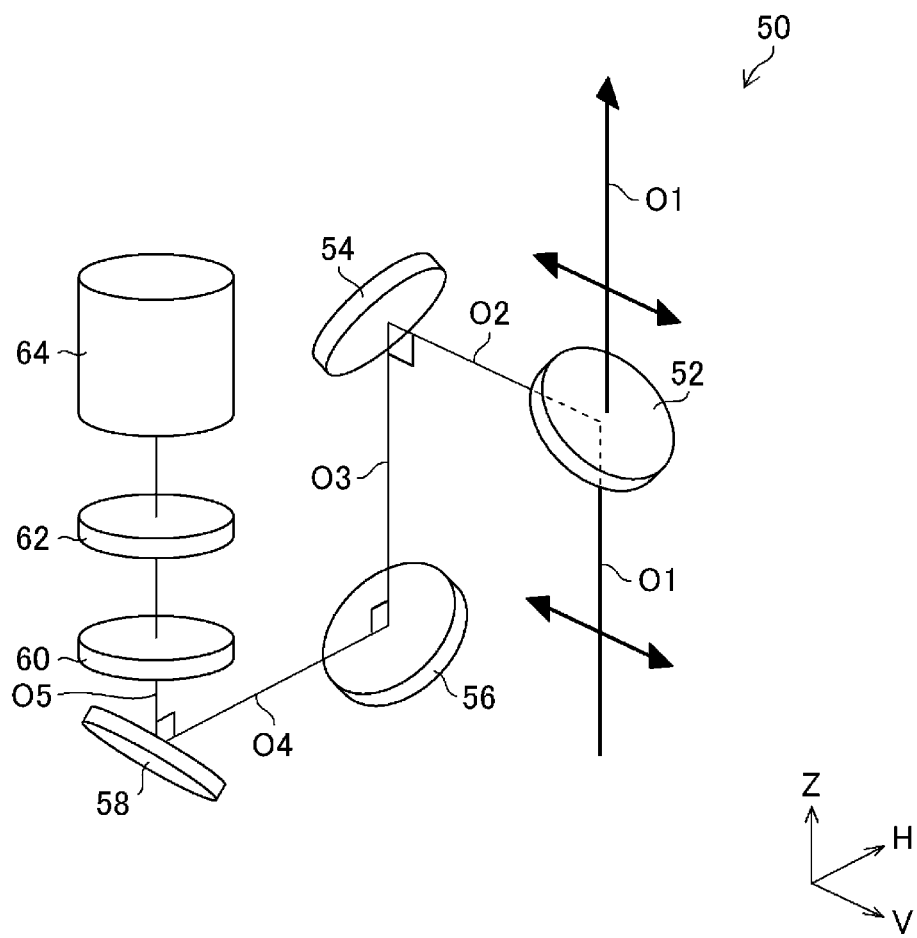
FIG. 3 is a perspective view schematically showing a configuration of a power monitor according to Embodiment 1.
Figure 4:
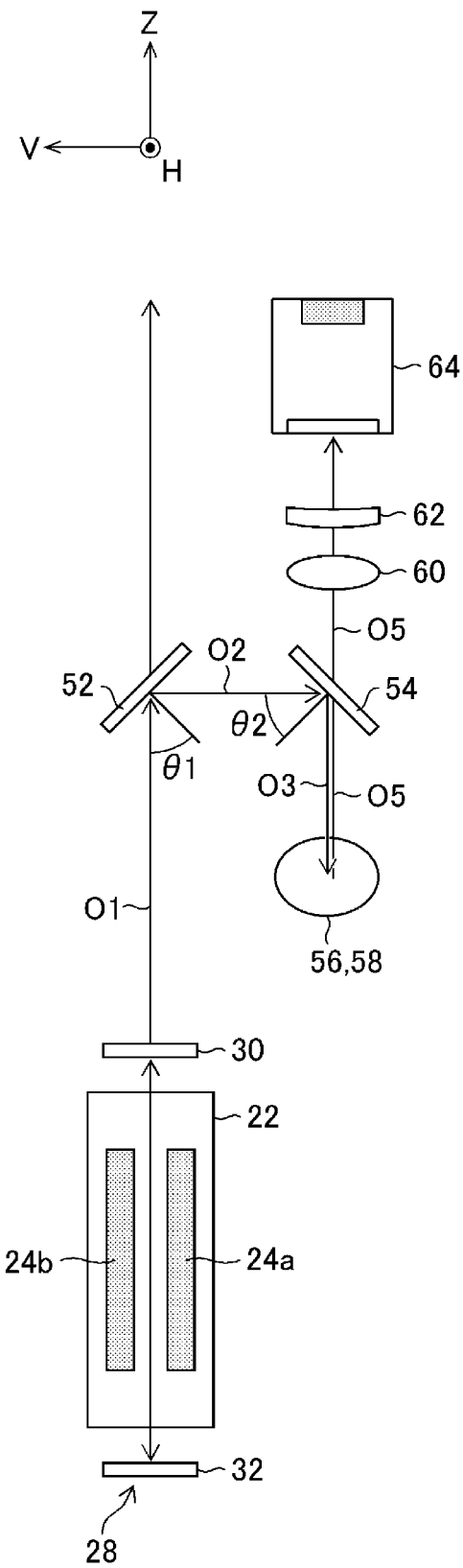
FIG. 4 is a front view schematically showing the configuration of the power monitor according to Embodiment 1.
Figure 5:
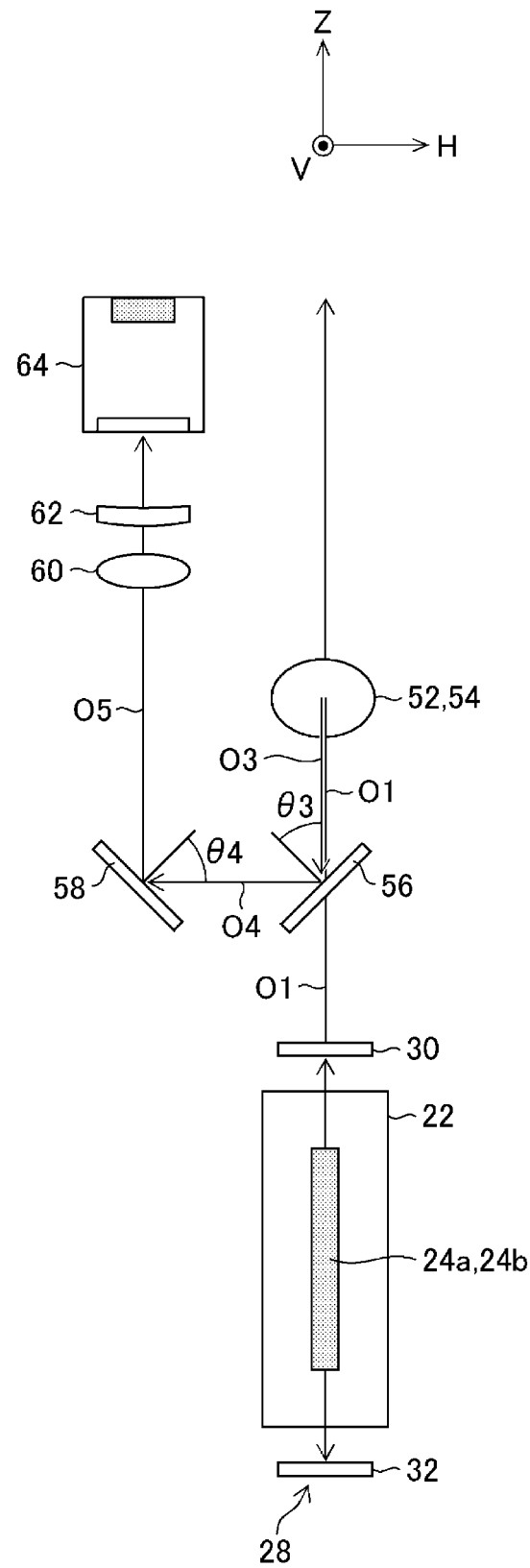
FIG. 5 is a side view schematically showing the configuration of the power monitor according to Embodiment 1.

FIGS. 3, 4, and 5 are a perspective view, a front view, and a side view schematically showing a configuration of a power monitor according to Embodiment 1. FIGS. 4 and 5 also show a chamber 22 and a laser resonator 28. In Embodiment 1, a traveling direction of an excimer laser beam (hereinafter referred to as a main beam) output from an output coupler 30 is defined to be a Z direction, and directions perpendicular to each other in a plane perpendicular to the Z direction are defined to be an H direction and a V direction.

A power monitor 50 (an example of an energy measuring apparatus) according to Embodiment 1 includes a first beam splitter 52, a second beam splitter 54, a third beam splitter 56, a fourth beam splitter 58, a light condensing lens 60, a diffuser 62, and an optical sensor 64.

The first beam splitter 52, the second beam splitter 54, the third beam splitter 56, and the fourth beam splitter 58 are made of a same material, calcium fluoride herein. Thus, the first beam splitter 52, the second beam splitter 54, the third beam splitter 56, and the fourth beam splitter 58 have the same reflection characteristic.

The first beam splitter 52, the second beam splitter 54, the third beam splitter 56, and the fourth beam splitter 58 are uncoated beam splitters.

The first beam splitter 52, the second beam splitter 54, the third beam splitter 56, and the fourth beam splitter 58 may have the same coating.

When the main beam is an XeCl excimer laser or an XeF excimer laser, the first beam splitter 52, the second beam splitter 54, the third beam splitter 56, and the fourth beam splitter 58 may be made of sapphire or synthetic quartz.

The first beam splitter 52 samples the main beam. An optical path on design of the main beam is a first optical path O1 in the Z direction. The first beam splitter 52 is arranged at a first incident angle θ1 on the first optical path O1, and reflects part of the main beam passing through the first optical path O1 to create a second optical path O2.

The first beam splitter 52 is arranged with a reflective surface that reflects the main beam being parallel to the H direction and inclined to the Z direction and the V direction. The first incident angle θ1 is herein 45 degrees. Specifically, the first beam splitter 52 is arranged with the reflective surface being inclined 45 degrees to the Z direction and the V direction. The first beam splitter 52 reflects 90 degrees part of the main beam passing through the first optical path O1 to create the second optical path O2 in a −V direction.

A main polarization component, which is the largest polarization component among polarization components, of the main beam passing through the first optical path O1 is parallel to the V direction. Thus, an incident plane of the first beam splitter 52 (a plane including the first optical path O1 and the second optical path O2, an example of a first incident plane) is parallel to the main polarization component of the main beam. Specifically, the first beam splitter 52 reflects as a P-polarized beam (P-reflects) the main beam passing through the first optical path O1.

As such, the first beam splitter 52 is preferably arranged such that the main polarization component of the main beam is a P-polarized beam of the first beam splitter 52 in terms of a reduction in reflectance. The power monitor 50 may be arranged such that the first beam splitter 52 reflects the main beam as a S-polarized beam (S-reflects).

The second beam splitter 54 is arranged at a second incident angle θ2 on the second optical path O2, and reflects part of the beam passing through the second optical path O2 to create a third optical path O3.

The second beam splitter 54 is arranged with a reflective surface that reflects the beam being parallel to the H direction and inclined to the Z direction and the V direction. The second incident angle θ2 is equal to the first incident angle θ1 and is 45 degrees. Specifically, the second beam splitter 54 is arranged with the reflective surface being inclined 45 degrees to the Z direction and the V direction.

Two angles being equal herein includes the two angles being substantially equal, not limited to the two angles being completely equal.

For example, the first incident angle θ1 and the second incident angle θ2 being equal includes a range in which the first incident angle θ1 and the second incident angle θ2 can be regarded to be equal. The range in which the first incident angle θ1 and the second incident angle θ2 can be regarded to be equal is a range in which a change in detection value due to a change in incident angle of the main beam described later can be suppressed.

The second beam splitter 54 reflects 90 degrees part of the beam passing through the second optical path O2 to create a third optical path O3 in a −Z direction.

A main polarization component of the beam passing through the second optical path O2 is parallel to the Z direction. Thus, the second beam splitter 54 P-reflects the beam passing through the second optical path O2. The incident plane of the first beam splitter 52 and an incident plane of the second beam splitter 54 (a plane including the second optical path O2 and the third optical path O3, an example of a second incident plane) are on the same plane. Specifically, the incident plane of the first beam splitter 52 and the incident plane of the second beam splitter 54 are on a first plane.

Two planes being on the same plane herein includes the two planes being substantially on the same plane, not limited to the two planes being completely on the same plane.

For example, the incident plane of the first beam splitter 52 and the incident plane of the second beam splitter 54 being on the same plane includes a range in which the incident planes can be regarded to be on the same plane. The range in which the incident planes can be regarded to be on the same plane is a range in which the first beam splitter 52 can P-reflect the main beam passing through the first optical path O1 and the second beam splitter 54 can P-reflect the beam passing through the second optical path O2.

The third beam splitter 56 is arranged at a third incident angle θ3 on the third optical path O3, and reflects part of the beam passing through the third optical path O3 to create a fourth optical path O4.

The third beam splitter 56 is arranged with a reflective surface that reflects the beam being parallel to the V direction and inclined to the Z direction and the H direction. The third incident angle θ3 is preferably equal to the first incident angle θ1 and is herein 45 degrees. Specifically, the third beam splitter 56 is arranged with the reflective surface being inclined 45 degrees to the Z direction and the H direction. The third beam splitter 56 reflects 90 degrees part of the beam passing through the third optical path O3 to create the fourth optical path O4 in a −H direction.

A main polarization component of the beam passing through the third optical path O3 is parallel to the V direction. Thus, the third beam splitter 56 S-reflects the beam passing through the third optical path O3. An incident plane of the third beam splitter 56 (a plane including the third optical path O3 and the fourth optical path O4, an example of a third incident plane) is perpendicular to the incident plane of the first beam splitter 52. Specifically, the incident plane of the third beam splitter 56 is on a second plane perpendicular to the first plane.

Two planes being perpendicular to each other herein includes the two planes being substantially perpendicular to each other, not limited to the two planes being completely perpendicular to each other.

For example, the incident plane of the first beam splitter 52 and the incident plane of the third beam splitter 56 being perpendicular to each other includes a range in which the incident planes can be regarded to be perpendicular to each other. The range in which the incident planes can be regarded to be perpendicular to each other is a range in which the first beam splitter 52 can P-reflect the main beam passing through the first optical path O1 and the third beam splitter 56 can S-reflect the beam passing through the third optical path O3.

The fourth beam splitter 58 is arranged at a fourth incident angle θ4 on the fourth optical path O4, and reflects part of the beam passing through the fourth optical path O4 to create a fifth optical path O5.

The fourth beam splitter 58 is arranged with a reflective surface that reflects the beam being parallel to the V direction and inclined to the Z direction and the H direction. The fourth incident angle θ4 is equal to the third incident angle θ3 and is 45 degrees. Specifically, the fourth beam splitter 58 is arranged with the reflective surface being inclined 45 degrees to the Z direction and the H direction. The fourth incident angle θ4 is preferably equal to the second incident angle θ2.

The fourth beam splitter 58 reflects 90 degrees part of the beam passing through the fourth optical path O4 to create the fifth optical path O5 in the Z direction.

A main polarization component of the beam passing through the fourth optical path O4 is parallel to the V direction. Thus, the fourth beam splitter 58 S-reflects the beam passing through the fourth optical path O4. The incident plane of the third beam splitter 56 and an incident plane of the fourth beam splitter 58 (a plane including the fourth optical path O4 and the fifth optical path O5, an example of a fourth incident plane) are on the same plane. Specifically, the incident plane of the third beam splitter 56 and the incident plane of the fourth beam splitter 58 are on the second plane.

The second beam splitter 54, the third beam splitter 56, and the fourth beam splitter 58 include light absorbing members (not shown) arranged on back sides of their reflective surfaces. The beam having passed through the second beam splitter 54, the third beam splitter 56, and the fourth beam splitter 58 is absorbed by the light absorbing members (not shown).

The light condensing lens 60 condenses the laser beam, and is arranged on the fifth optical path O5. The light condensing lens 60 condenses the beam passing through the fifth optical path O5 on a light receiving portion of the optical sensor 64. The diffuser 62 diffuses the incident beam to prevent deterioration of the optical sensor 64, and is made of, for example, opaque glass. The diffuser 62 smooths and emits the laser beam condensed by the light condensing lens 60. The optical sensor 64 (an example of an energy sensor) is, for example, a photodiode. The optical sensor 64 detects pulse energy E of the incident laser beam.

The optical sensor 64 is herein arranged on the fifth optical path O5, but the optical sensor 64 may be arranged on an optical path posterior to the fifth optical path O5. For example, after the fifth optical path O5, a new optical path may be created by four beam splitters arranged in the same manner as the first beam splitter 52, the second beam splitter 54, the third beam splitter 56, and the fourth beam splitter 58, and the optical sensor 64 may be arranged on an output optical path of the new optical path.

An excimer laser apparatus 1 can use the power monitor 50 in place of the power monitor 38.

3.2 Operation

The main beam output from the output coupler 30 and passing through the first optical path O1 in the Z direction enters the first beam splitter 52 at the first incident angle θ1. Part of the main beam having entered the first beam splitter 52 is P-reflected and reflected 90 degrees in the −V direction. The P-reflected beam passes through the second optical path O2 and enters the second beam splitter 54 at the second incident angle θ2.

Part of the beam having entered the second beam splitter 54 is P-reflected and reflected 90 degrees in the −Z direction. The P-reflected beam passes through the third optical path O3 and enters the third beam splitter 56 at the third incident angle θ3.

Figure 6:
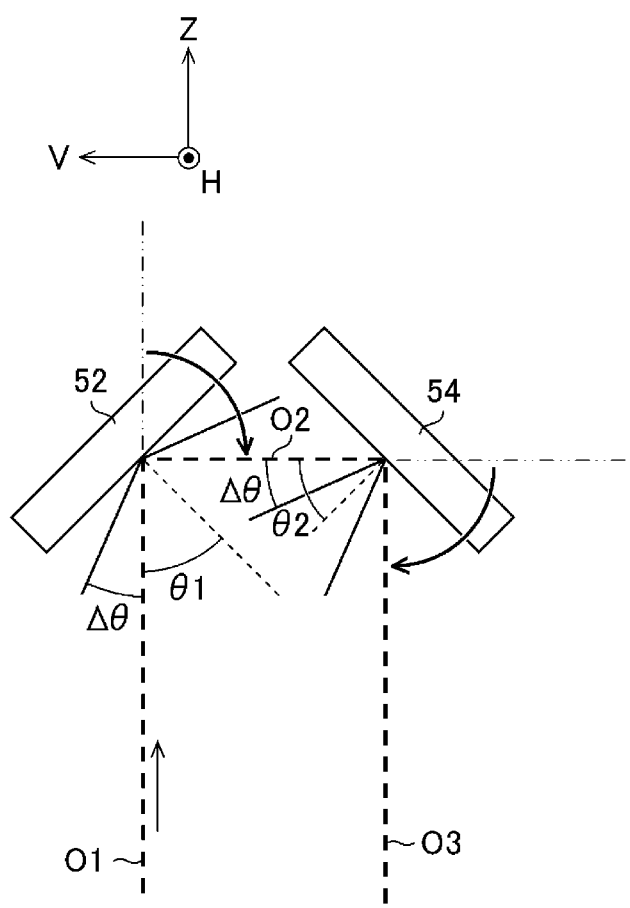
FIG. 6 is an explanatory view for suppression of a change in detection value due to a change in incident angle of a main beam.
Figure 7:
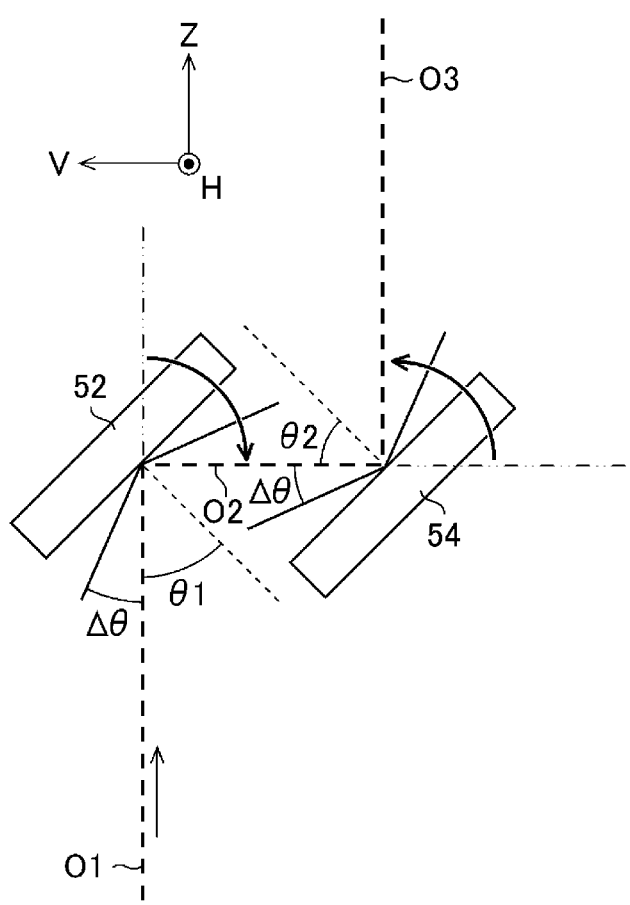
FIG. 7 is an explanatory view for suppression of a change in detection value due to a change in incident angle of the main beam.
Figure 8:
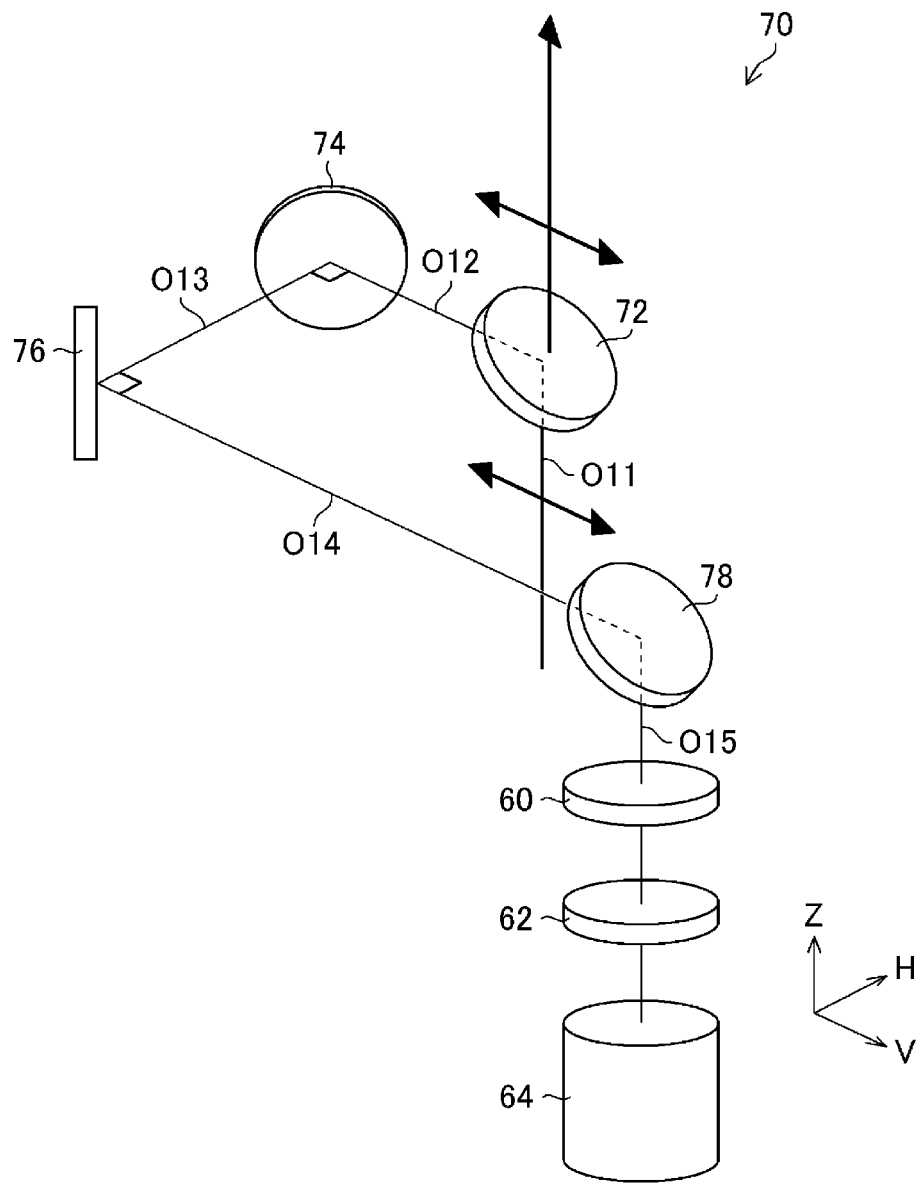
FIG. 8 is a perspective view schematically showing a configuration of a power monitor according to Embodiment 2.

FIGS. 6 and 7 are explanatory views for suppression of a change in detection value due to a change in incident angle of the main beam entering the first beam splitter 52.

In the power monitor 50, the second beam splitter 54 is arranged such that the incident angle changes in a direction opposite to a direction of a change in incident angle on the first beam splitter 52 within a VZ plane. Specifically, as shown in FIG. 6, the first beam splitter 52 and the second beam splitter 54 are arranged to reflect the incident beam in opposite directions. Specifically, when directions from the back sides toward the reflective surfaces of the first beam splitter 52 and the second beam splitter 54 are defined to be directions of normal vectors of the beam splitters, V direction components of their normal vectors are in the opposite directions and Z direction components are in the same direction. With this configuration, the first beam splitter 52 folds the first optical path O1 clockwise as a first direction on the first plane to create the second optical path O2. The second beam splitter 54 folds the second optical path O2 clockwise as the first direction on the first plane to create the third optical path O3.

The first beam splitter 52 and the second beam splitter 54 fold the optical paths clockwise, but may fold the optical paths counterclockwise. As such, the power monitor 50 uses the first beam splitter 52 and the second beam splitter 54 to fold the optical paths in the same direction, which may be clockwise or counterclockwise, viewing the incident plane of the first beam splitter 52 in the same direction, thereby creating the optical paths. Specifically, the first direction herein is not an absolute direction with respect to the Z direction, the H direction, or the V direction, but is a relative direction with respect to the traveling direction of the laser beam.

Here, it is assumed that pointing of an optical axis of the main beam is shifted, and that the incident angle of the main beam on the first beam splitter 52 increases or decreases, by an angle error Δθ of the incident angle, from the incident angle θ1 of the first optical path O1 on design within the VZ plane. When the incident angle of the main beam increases or decreases by Δθ within the VZ plane, a reflection angle of the beam reflected by the first beam splitter 52 also increases or decreases by Δθ within the VZ plane. As a result, the incident angle of the beam entering the second beam splitter 54 increases or decreases by −Δθ within the VZ plane.

As such, when the incident angle of the main beam increases or decreases within the VZ plane, reflectance of the first beam splitter 52 changes due to its dependence on the incident angle. On the other hand, the incident angle on the second beam splitter 54 changes in the direction opposite to the direction of the increase or decrease in incident angle on the first beam splitter 52. Thus, the reflectance of the first beam splitter 52 and the reflectance of the second beam splitter 54 change in the opposite directions due to their dependence on the incident angles. Thus, the product of the reflectances is less likely to change, thereby suppressing a change in pulse energy detection value due to the increase or decrease in incident angle of the main beam.

The angle error Δθ of the incident angle is preferably 30 milliradians (≈1.72 degrees) or less, and more preferably 10 milliradians (≈0.57 degrees) or less.

In the example in FIG. 7, the first beam splitter 52 and the second beam splitter 54 are arranged to reflect the incident beam in the same direction. Specifically, the first beam splitter 52 and the second beam splitter 54 are arranged such that V direction components and Z direction components of their normal vectors are in the opposite directions. With this configuration, the first beam splitter 52 and the second beam splitter 54 fold the optical paths in the opposite directions when viewed in the same direction. In this case, the change in angle of the main beam entering the first beam splitter 52 cannot be cancelled. This cannot suppress a change in pulse energy detection value due to an increase or a decrease in incident angle of the main beam.

Returning to the descriptions of FIGS. 3, 4, and 5, part of the laser beam having entered the third beam splitter 56 is S-reflected and reflected 90 degrees in the −H direction. The S-reflected laser beam passes through the fourth optical path O4 and enters the fourth beam splitter 58 at a fourth incident angle θ4.

Part of the beam having entered the fourth beam splitter 58 is S-reflected and reflected 90 degrees in the Z direction. The S-reflected beam passes through the fifth optical path O5 and enters the light condensing lens 60.

In the power monitor 50, the third beam splitter 56 and the fourth beam splitter 58 are arranged to suppress a change in detection value due to the change in incident angle of the main beam in relation to the change in incident angle on the first beam splitter 52 within the HZ plane. Specifically, as shown in FIG. 5, the third beam splitter 56 and the fourth beam splitter 58 are arranged such that H direction components of their normal vectors are in the opposite directions and Z direction components are in the same direction. With this configuration, the third beam splitter 56 folds the third optical path O3 clockwise as a second direction on the second plane to create the fourth optical path O4. The fourth beam splitter 58 folds the fourth optical path O4 clockwise as the second direction on the second plane to create the fifth optical path O5. The second direction is not an absolute direction with respect to the Z direction, the H direction, and the V direction, but is a relative direction with respect to the traveling direction of the laser beam. The angle error Δθ of the incident angle within the HZ plane is also preferably 30 milliradians (≈1.72 degrees) or less, and more preferably 10 milliradians (≈0.57 degrees) or less.

Again returning to the descriptions of FIGS. 3, 4, and 5, the laser beam having entered the light condensing lens 60 is condensed and passes through the diffuser 62. The beam having passed through the diffuser 62 is smoothed and enters the optical sensor 64. The optical sensor 64 outputs a detection signal in accordance with intensity of the incident beam.

The beam entering the optical sensor 64 is attenuated as compared to the main beam as described below. It is assumed that P-polarization reflectance (% Rp) is 0.713% and S-polarization reflectance (% Rs) is 8.446% when a wavelength of the main beam is 248 nm and an incident angle on calcium fluoride is 45 degrees, of which the first beam splitter 52, the second beam splitter 54, the third beam splitter 56, and the fourth beam splitter 58 are made.

In this case, reflectance % Ra of the four beam splitters is $$\% Ra = 0.00713 \times 0.00713 \times 0.08446 \times 0.08446 \times 2^4$$
$$= 5.08231 \times 10^{-6}$$
$$= 5.08231 \times 10^{-4} \%$$

where the term $2^4$ denotes back side reflection.

3.3 Effect

With the power monitor 50 according to Embodiment 1, the main polarization component of the main beam is arranged parallel to the incident plane of the first beam splitter 72, thereby reducing reflectance.

Also, the four beam splitters can attenuate the laser beam entering the optical sensor 64. This can increase the life of the optical sensor 64.

Also, using the two pairs of beam splitters, the first beam splitter 52 and the second beam splitter 54, and the third beam splitter 56 and the fourth beam splitter 58, which reflect the incident beam in the opposite directions, can suppress the change in pulse energy detection value due to the change in incident angle.

Further, the main beam is P-reflected twice and S-reflected twice and then input to the optical sensor 64. As such, the number of times of P-reflection is the same as the number of times of S-reflection, and thus even if polarization purity of the main beam changes, transmittance (=input of the optical sensor 64/output of the main beam) does not change. This can suppress the change in pulse energy detection value due to the change in polarization purity of the main beam.

4. Embodiment 2

4.1 Configuration

Figure 9:
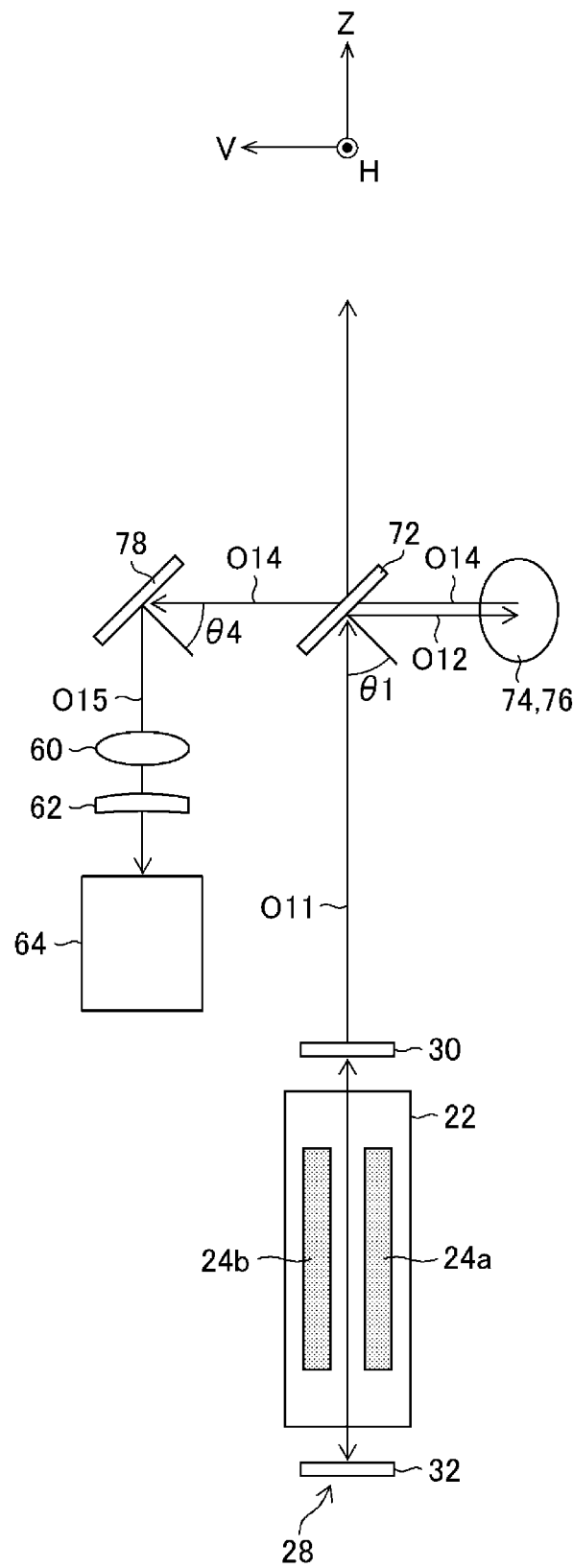
FIG. 9 is a front view schematically showing the configuration of the power monitor according to Embodiment 2.
Figure 10:
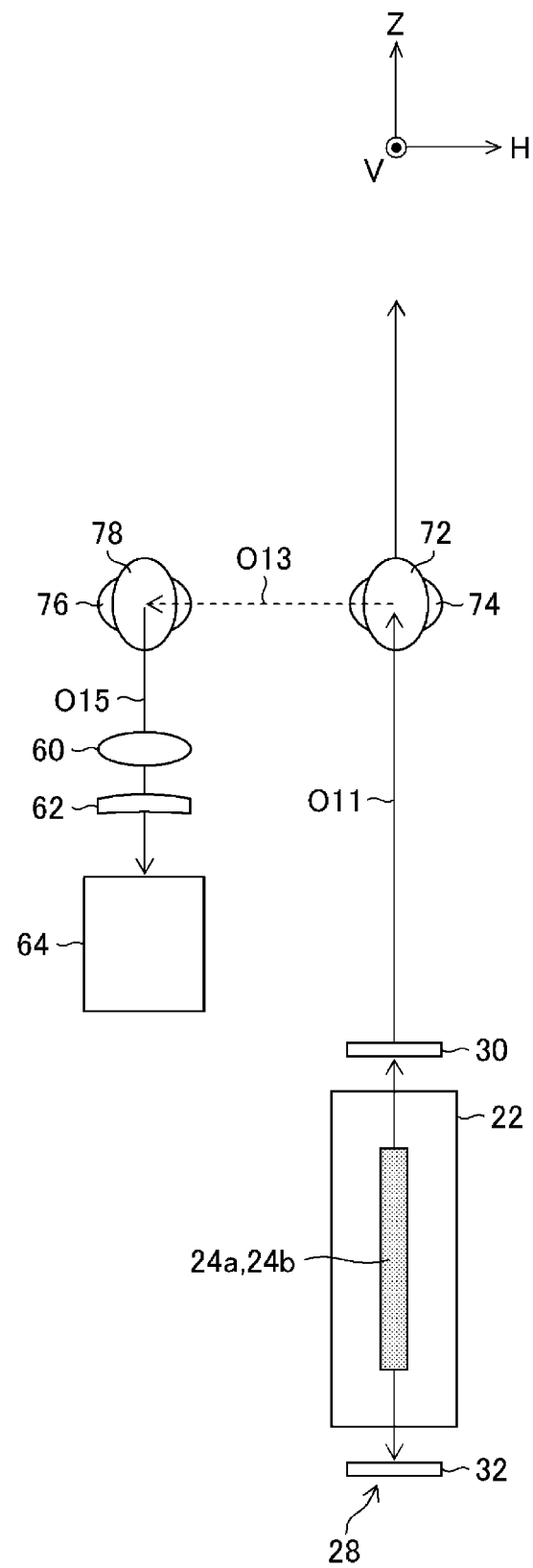
FIG. 10 is a side view schematically showing the configuration of the power monitor according to Embodiment 2.

FIGS. 8, 9, 10, and 11 are a perspective view, a front view, a side view, and a top view schematically showing a configuration of a power monitor according to Embodiment 2. FIGS. 9 and 10 also show the chamber 22 and the laser resonator 28. As in Embodiment 1, the traveling direction of the main beam output from the output coupler 30 is defined to be a Z direction, and directions perpendicular to each other in a plane perpendicular to the Z direction are defined to be an H direction and a V direction.

A power monitor 70 according to Embodiment 2 includes a first beam splitter 72, a second beam splitter 74, a third beam splitter 76, and a fourth beam splitter 78.

The first beam splitter 72, the second beam splitter 74, the third beam splitter 76, and the fourth beam splitter 78 are uncoated beam splitters made of calcium fluoride like the first beam splitter 52, the second beam splitter 54, the third beam splitter 56, and the fourth beam splitter 58 in Embodiment 1.

The first beam splitter 72 samples the main beam. The main beam passes through a first optical path O11 in the Z direction.

The first beam splitter 72 is arranged at a first incident angle θ1 on the first optical path O11 of the main beam, and reflects part of the main beam passing through the first optical path O11 to create a second optical path O12.

The first beam splitter 72 is arranged with a reflective surface that reflects the main beam being parallel to the H direction and inclined to the Z direction and the V direction. The first incident angle θ1 is herein 45 degrees. Specifically, the first beam splitter 72 is arranged with the reflective surface being inclined 45 degrees to the Z direction and the V direction. The first beam splitter 72 reflects 90 degrees part of the main beam passing through the first optical path O11 to create the second optical path O12 in a −V direction.

A main polarization component of the main beam passing through the first optical path O11 is parallel to the V direction. Thus, the first beam splitter 72 P-reflects the main beam. The power monitor 70 may be arranged such that the first beam splitter 72 S-reflects the main beam. An incident plane of the first beam splitter 72 (an example of a first incident plane) is parallel to a first plane.

The second beam splitter 74 is arranged at a second incident angle θ2 on the second optical path O12, and reflects part of the beam passing through the second optical path O2 to create a third optical path O13.

The second beam splitter 74 is arranged with a reflective surface that reflects the beam being parallel to the Z direction and inclined to the H direction and the V direction. The second incident angle θ2 is preferably equal to the first incident angle θ1 and is herein 45 degrees. Specifically, the second beam splitter 74 is arranged with the reflective surface being inclined 45 degrees to the H direction and the V direction.

The second beam splitter 74 reflects 90 degrees part of the beam passing through the second optical path O12 to create a third optical path O13 in a −H direction.

A main polarization component of the beam passing through the second optical path O12 is parallel to the Z direction. Thus, the second beam splitter 74 S-reflects the beam passing through the second optical path O12.

An incident plane of the second beam splitter 74 (an example of a second incident plane) is perpendicular to the first plane.

The third beam splitter 76 is arranged at a third incident angle θ3 on the third optical path O13, and reflects part of the beam passing through the third optical path O3 to create a fourth optical path O14.

The third beam splitter 76 is arranged with a reflective surface that reflects the beam being parallel to the Z direction and inclined to the V direction and the H direction. The third incident angle θ3 is equal to the second incident angle θ2 and is 45 degrees. Specifically, the third beam splitter 76 is arranged with the reflective surface being inclined 45 degrees to the V direction and the H direction.

The third beam splitter 76 reflects 90 degrees part of the beam passing through the third optical path O13 to create the fourth optical path O14 in the V direction.

A main polarization component of the beam passing through the third optical path O13 is parallel to the Z direction. Thus, the third beam splitter 76 S-reflects the beam passing through the third optical path O13.

The incident plane of the second beam splitter 74 and an incident plane of the third beam splitter 76 (an example of a third incident plane) are on the same plane. Specifically, the incident plane of the second beam splitter 74 and the incident plane of the third beam splitter 76 are on a second plane perpendicular to the first plane.

The fourth beam splitter 78 is arranged at a fourth incident angle θ4 on the fourth optical path O14, and reflects part of the beam passing through the fourth optical path O4 to create a fifth optical path O15.

The fourth beam splitter 78 is arranged on the fourth optical path O14 with a reflective surface being parallel to the H direction and inclined to the Z direction and the V direction. The fourth incident angle θ4 is equal to the first incident angle θ1 and is 45 degrees. Specifically, the fourth beam splitter 78 is arranged with the reflective surface being inclined 45 degrees to the Z direction and the V direction. The fourth incident angle θ4 is preferably equal to the third incident angle θ3.

The fourth beam splitter 78 reflects 90 degrees part of the beam passing through the fourth optical path O14 to create the fifth optical path O15 in the −Z direction.

A main polarization component of the beam passing through the fourth optical path O14 is parallel to the Z direction. Thus, the fourth beam splitter 78 P-reflects the beam passing through the fourth optical path O14.

The incident plane of the first beam splitter 72 is parallel to an incident plane of the fourth beam splitter 78 (an example of a fourth incident plane). Specifically, the incident plane of the fourth beam splitter 78 is parallel to the first plane.

An excimer laser apparatus 1 can use the power monitor 70 in place of the power monitor 38.

4.2 Operation

The main beam output from the output coupler 30 and passing through the first optical path O11 in the Z direction enters the first beam splitter 72 at the first incident angle θ1. Part of the main beam having entered the first beam splitter 72 is P-reflected and reflected 90 degrees in the −V direction. The P-reflected beam passes through the second optical path O12 and enters the second beam splitter 74 at the second incident angle θ2.

Part of the beam having entered the second beam splitter 74 is S-reflected and reflected 90 degrees in the −H direction. The S-reflected beam passes through the third optical path O13 and enters the third beam splitter 76 at the third incident angle θ3.

Part of the laser beam having entered the third beam splitter 76 is S-reflected and reflected 90 degrees in the V direction. The S-reflected laser beam passes through the fourth optical path O14 and enters the fourth beam splitter 78 at the fourth incident angle θ4.

Part of the beam having entered the fourth beam splitter 78 is P-reflected and reflected 90 degrees in the −Z direction. The P-reflected beam passes through the fifth optical path O15 and enters the light condensing lens 60.

The laser beam having entered the light condensing lens 60 is condensed, passes through the diffuser 62, and enters the optical sensor 64. The optical sensor 64 outputs a detection signal in accordance with intensity of the incident laser beam. The optical sensor 64 is herein arranged on the fifth optical path O15, but the optical sensor 64 may be arranged on an optical path posterior to the fifth optical path O15.

Figure 12:
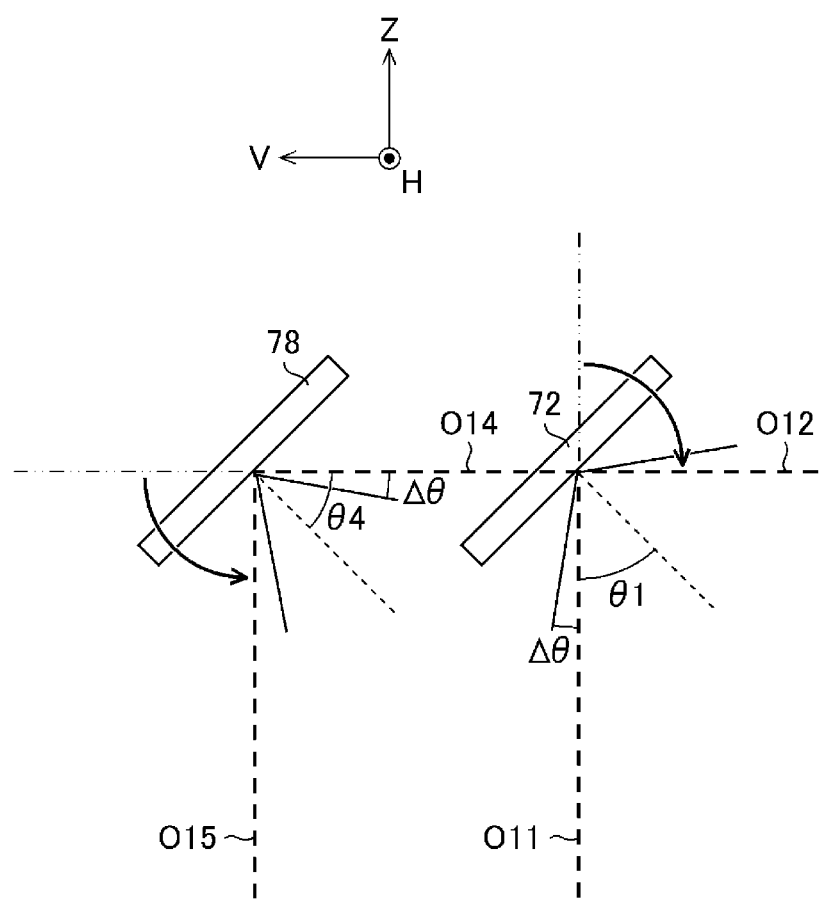
FIG. 12 is an explanatory view for suppression of a change in detection value due to a change in incident angle of a main beam.

FIG. 12 is an explanatory view for suppression of a change in detection value due to a change in incident angle of the main beam entering the first beam splitter 72.

In the power monitor 70, the fourth beam splitter 78 is arranged such that the incident angle changes in a direction opposite to a direction of a change in incident angle on the first beam splitter 72 within a VZ plane. Specifically, the first beam splitter 72 and the fourth beam splitter 78 are arranged such that V direction components and Z direction components of their normal vectors are in the same direction. With this configuration, the first beam splitter 72 folds the first optical path O11 clockwise as a first direction on the first incident plane to create the second optical path O12. The fourth beam splitter 78 folds the fourth optical path O14 counterclockwise opposite to the first direction on the fourth incident plane to create the fifth optical path O15. The first beam splitter 72 may fold the optical path counterclockwise and the fourth beam splitter 78 may fold the optical path clockwise.

As such, the power monitor 70 uses the first beam splitter 72 and the fourth beam splitter 78 oriented in the same direction such that the first beam splitter 72 folds the optical path clockwise or counterclockwise as the first direction when viewed in the same direction, and that the fourth beam splitter 78 folds the optical path in the direction opposite to the first direction, thereby creating the optical paths.

Here, it is assumed that pointing of an optical axis of the main beam is shifted, and that the incident angle of the main beam on the first beam splitter 72 increases or decreases, by an angle error Δθ, from the incident angle θ1 of the first optical path O11 on design within the VZ plane. When the incident angle of the main beam increases or decreases by Δθ within the VZ plane, a reflection angle of the beam reflected by the first beam splitter 72 also increases or decreases by Δθ within the VZ plane.

The reflection by the second beam splitter 74 and the third beam splitter 76 reverse the increase or decrease by Δθ. As a result, the incident angle of the fourth optical path O14 on the fourth beam splitter 78 increases or decreases by −Δθ.

As such, when the incident angle of the main beam increases or decreases, reflectance of the first beam splitter 72 changes due to its dependence on the incident angle. On the other hand, the incident angle on the fourth beam splitter 78 changes in the direction opposite to the direction of the increase or decrease in incident angle on the first beam splitter 72. Thus, the reflectance of the first beam splitter 72 and the reflectance of the fourth beam splitter 78 change in the opposite directions due to their dependence on the incident angles. Thus, the product of the reflectances is less likely to change, thereby suppressing a change in pulse energy detection value due to the increase or decrease in incident angle of the main beam.

The angle error Δθ of the incident angle is preferably 30 milliradians (≈1.72 degrees) or less, and more preferably 10 milliradians (≈0.57 degrees) or less.

Figure 11:
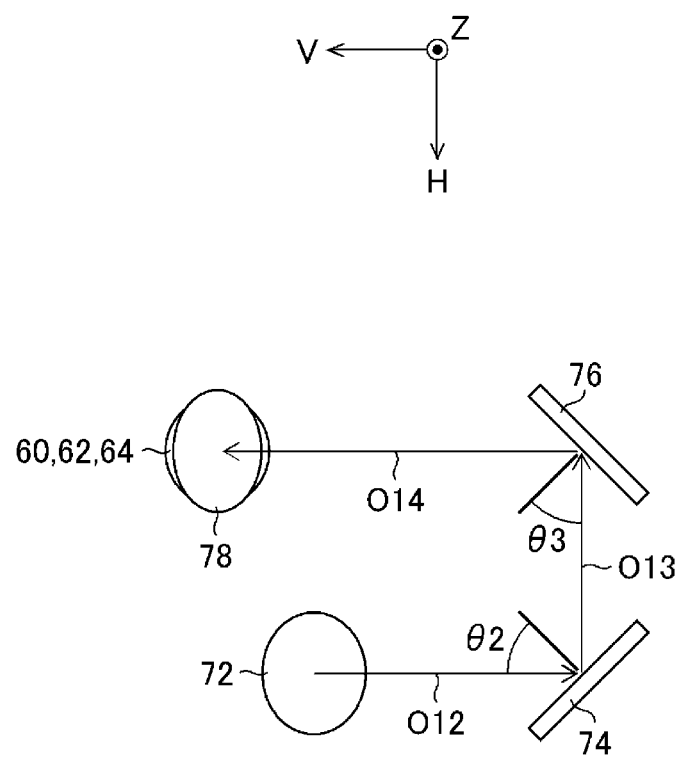
FIG. 11 is a top view schematically showing the configuration of the power monitor according to Embodiment 2.

In the power monitor 70, the second beam splitter 74 and the third beam splitter 76 are arranged to suppress a change in detection value due to the change in incident angle of the main beam in relation to the change in incident angle on the first beam splitter 72 within the HZ plane. Specifically, as shown in FIG. 11, the second beam splitter 74 and the third beam splitter 76 are arranged such that H direction components of their normal vectors are in the opposite directions and V direction components are in the same direction. With this configuration, the second beam splitter 74 folds the second optical path O12 counterclockwise as a second direction on the second plane to create the third optical path O13. The third beam splitter 76 folds the third optical path O13 counterclockwise as the second direction on the second plane to create the fourth optical path O14. The angle error of the incident angle within the HZ plane is also preferably 30 milliradians (≈1.72 degrees) or less, and more preferably 10 milliradians (≈0.57 degrees) or less.

4.3 Effect

With the power monitor 70 according to Embodiment 2, the main polarization component of the main beam is arranged parallel to the incident plane of the first beam splitter 72, thereby reducing reflectance.

Also, the four beam splitters can attenuate the laser beam entering the optical sensor 64. This can increase the life of the optical sensor 64.

Also, using the two pairs of beam splitters, the first beam splitter 72 and the fourth beam splitter 78, and the second beam splitter 74 and the third beam splitter 76, which reflect the incident beam in the opposite directions, can suppress the change in pulse energy detection value due to the change in incident angle.

Further, the number of times of P-reflection of the main beam is the same as the number of times of S-reflection of the main beam, and thus even if polarization purity of the main beam changes, transmittance does not change. This can suppress the change in pulse energy detection value due to the change in polarization purity of the main beam.

5. Embodiment 3

In Embodiments 1 and 2, the case of the first incident angle θ1, the second incident angle θ2, the third incident angle θ3, and the fourth incident angle θ4 being 45 degrees has been illustrated, but the incident angle may be any angle other than 45 degrees. In Embodiment 3, the case of the first incident angle θ1, the second incident angle θ2, the third incident angle θ3, and the fourth incident angle θ4 being 30 degrees will be illustrated.

5.1 Configuration

Figure 13:
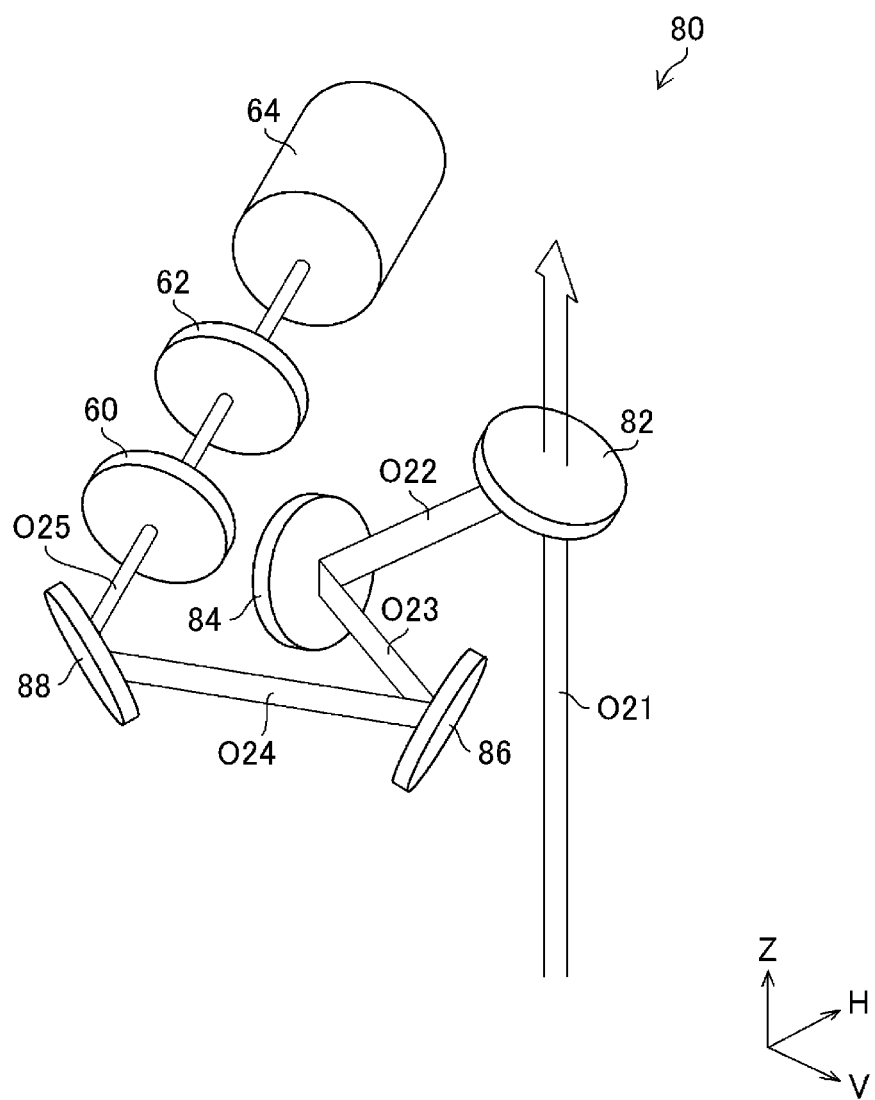
FIG. 13 is a perspective view schematically showing a configuration of a power monitor according to Embodiment 3.
Figure 14:
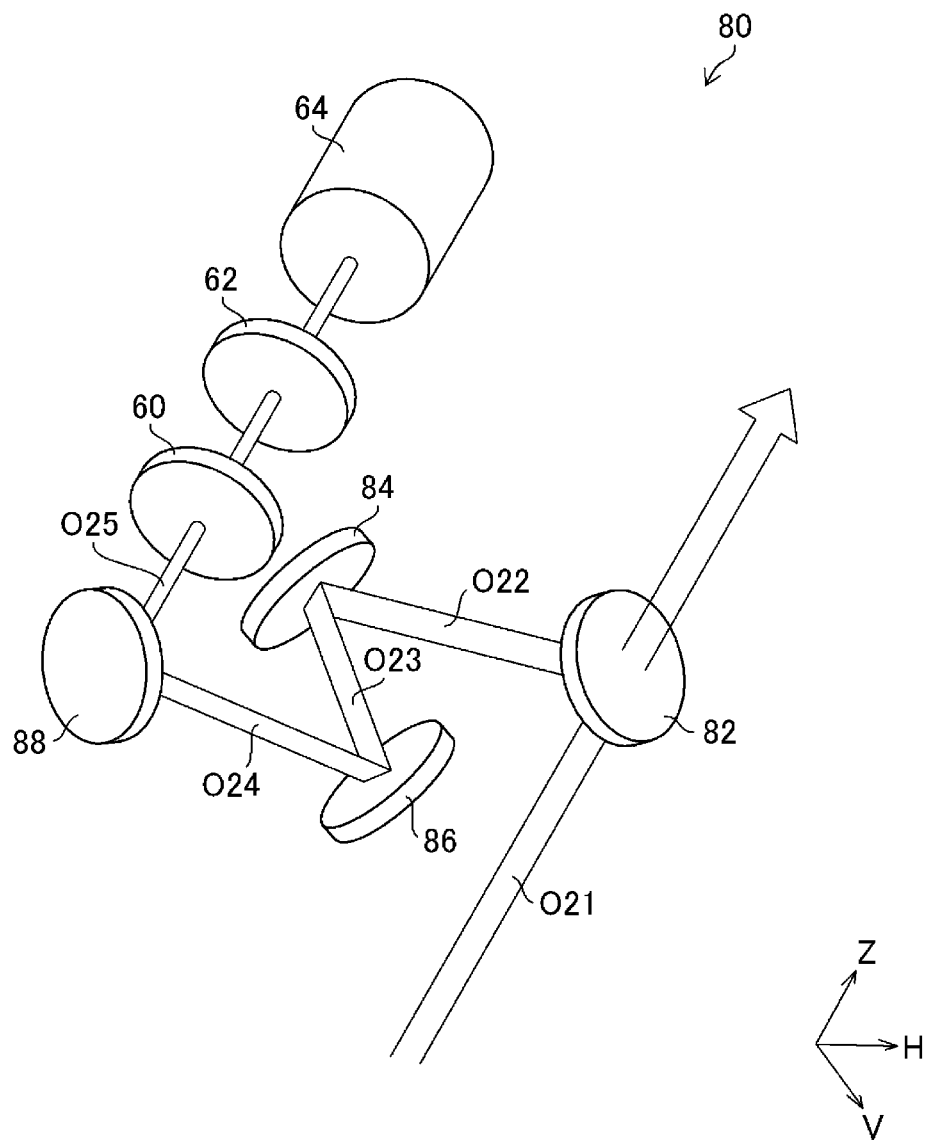
FIG. 14 is a perspective view schematically showing the configuration of the power monitor according to Embodiment 3.

FIGS. 13 and 14 are perspective views schematically showing a configuration of a power monitor according to Embodiment 3. FIGS. 13 and 14 show the configuration viewed from different perspectives. As in Embodiment 1, the traveling direction of the main beam output from the output coupler 30 is defined to be a Z direction, and directions perpendicular to each other in a plane perpendicular to the Z direction are defined to be an H direction and a V direction.

A power monitor 80 according to Embodiment 3 includes a first beam splitter 82, a second beam splitter 84, a third beam splitter 86, and a fourth beam splitter 88.

The first beam splitter 82, the second beam splitter 84, the third beam splitter 86, and the fourth beam splitter 88 are uncoated beam splitters made of calcium fluoride.

The first beam splitter 82 samples the main beam. The main beam passes through a first optical path O21 in the Z direction. The first beam splitter 52 is arranged at a first incident angle of 30 degrees on the first optical path O21 of the main beam. The first beam splitter 82 reflects 60 degrees part of the main beam passing through the first optical path O21 to create a second optical path O22.

The second beam splitter 84 is arranged at a second incident angle of 30 degrees, which is equal to the first incident angle, on the second optical path O22. The second beam splitter 84 reflects 60 degrees part of the beam passing through the second optical path O22 to create a third optical path O23. An incident plane of the first beam splitter 82 (an example of a first incident plane) and an incident plane of the second beam splitter 84 (an example of a second incident plane) are on the same plane.

The third beam splitter 86 is arranged at a third incident angle of 30 degrees on the third optical path O23. The third beam splitter 86 reflects 60 degrees part of the beam passing through the third optical path O23 to create a fourth optical path O24. An incident plane of the third beam splitter 86 (an example of a third incident plane) is perpendicular to the incident plane of the first beam splitter 82.

The fourth beam splitter 88 is arranged at a fourth incident angle of 30 degrees, which is equal to the third incident angle, on the fourth optical path O24. The fourth beam splitter 88 reflects 60 degrees part of the beam passing through the fourth optical path O24 to create a fifth optical path O25. The incident plane of the third beam splitter 86 (an example of a third incident plane) and an incident plane of the fourth beam splitter 88 (an example of a fourth incident plane) are on the same plane.

An excimer laser apparatus 1 can use the power monitor 80 in place of the power monitor 38.

5.2 Operation

The main beam output from the output coupler 30 and passing through the first optical path O21 in the Z direction enters the first beam splitter 82 at the first incident angle θ1. Part of the main beam having entered the first beam splitter 82 is P-reflected and reflected 60 degrees. The P-reflected beam passes through the second optical path O22 and enters the second beam splitter 84 at the second incident angle θ2.

Part of the beam having entered the second beam splitter 84 is P-reflected and reflected 60 degrees. The P-reflected beam passes through the third optical path O23 and enters the third beam splitter 86 at the third incident angle θ3.

The power monitor 80 uses the first beam splitter 82 and the second beam splitter 84 to fold the optical paths clockwise or counterclockwise as the same direction, viewing the incident plane of the first beam splitter 82 in the same direction, thereby creating the optical paths. This suppresses a change in detection value due to a change in incident angle of the main beam entering the first beam splitter 82.

Part of the laser beam having entered the third beam splitter 86 is S-reflected and reflected 60 degrees. The S-reflected laser beam passes through the fourth optical path O24 and enters the fourth beam splitter 88 at the fourth incident angle θ4.

Part of the beam having entered the fourth beam splitter 88 is S-reflected and reflected 60 degrees. The S-reflected beam passes through the fifth optical path O25 and enters the light condensing lens 60.

The power monitor 80 uses the third beam splitter 86 and the fourth beam splitter 88 to fold the optical paths clockwise or counterclockwise as the same direction, viewing the incident plane of the third beam splitter 86 in the same direction, thereby creating the optical paths. This suppresses a change in detection value due to a change in incident angle of the main beam entering the first beam splitter 82.

The laser beam having entered the light condensing lens 60 is condensed, passes through the diffuser 62, and enters the optical sensor 64. The optical sensor 64 outputs a detection signal in accordance with intensity of the incident beam.

5.3 Effect

With the power monitor 80 according to Embodiment 3, a main polarization component of the main beam is arranged parallel to the incident plane of the first beam splitter 82, thereby reducing reflectance.

Also, the four beam splitters can attenuate the laser beam entering the optical sensor 64. This can increase the life of the optical sensor 64.

Also, using the two pairs of beam splitters, the first beam splitter 82 and the second beam splitter 84, and the third beam splitter 86 and the fourth beam splitter 88, which reflect the incident beam in the opposite directions, can suppress the change in pulse energy detection value due to the change in incident angle.

Further, the number of times of P-reflection of the main beam is the same as the number of times of S-reflection of the main beam, and thus even if polarization purity of the main beam changes, transmittance does not change. This can suppress the change in pulse energy detection value due to the change in polarization purity of the main beam.

6. Others

The description above is intended to be merely illustrative and the present disclosure is not limited thereto. Therefore, it would be obvious to those skilled in the art that various modifications to the embodiments of the present disclosure would be possible without departing from the spirit and the scope of the appended claims.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. An energy measuring apparatus for measuring energy of a laser beam output from a laser oscillator, the energy measuring apparatus comprising:
   a first beam splitter arranged at a first incident angle on a first optical path of the laser beam output from the laser oscillator, and configured to reflect part of the laser beam passing through the first optical path to create a second optical path;
   a second beam splitter arranged at a second incident angle on the second optical path, and configured to reflect part of the laser beam passing through the second optical path to create a third optical path;
   a third beam splitter arranged at a third incident angle on the third optical path, and configured to reflect part of the laser beam passing through the third optical path to create a fourth optical path;
   a fourth beam splitter arranged at a fourth incident angle on the fourth optical path, and configured to reflect part of the laser beam passing through the fourth optical path to create a fifth optical path; and
   an energy sensor arranged on the fifth optical path or an optical path posterior to the fifth optical path,
   the first incident angle being equal to the second incident angle,
   the third incident angle being equal to the fourth incident angle,
   a first incident plane of the first beam splitter and a second incident plane of the second beam splitter being on a first plane,
   a third incident plane of the third beam splitter and a fourth incident plane of the fourth beam splitter being on a second plane perpendicular to the first plane,
   the first beam splitter folding the first optical path in a first direction on the first plane to create the second optical path,
   the second beam splitter folding the second optical path in the first direction on the first plane to create the third optical path,
   the third beam splitter folding the third optical path in a second direction on the second plane to create the fourth optical path,
   the fourth beam splitter folding the fourth optical path in the second direction on the second plane to create the fifth optical path.

2. The energy measuring apparatus according to claim 1, wherein the first beam splitter, the second beam splitter, the third beam splitter, and the fourth beam splitter are uncoated beam splitters.

3. The energy measuring apparatus according to claim 1, wherein the first beam splitter, the second beam splitter, the third beam splitter, and the fourth beam splitter are made of a same material.

4. The energy measuring apparatus according to claim 3, wherein the same material is calcium fluoride.

5. The energy measuring apparatus according to claim 1, wherein the first incident angle, the second incident angle, the third incident angle, and the fourth incident angle are equal.

6. The energy measuring apparatus according to claim 5, wherein the first incident angle, the second incident angle, the third incident angle, and the fourth incident angle are 45 degrees.

7. The energy measuring apparatus according to claim 1, wherein the first beam splitter is arranged to reflect, as a P-polarized beam, a largest polarization component among polarization components of the laser beam output from the laser oscillator.

8. The energy measuring apparatus according to claim 1, further comprising a lens arranged between the fourth beam splitter and the energy sensor.

9. The energy measuring apparatus according to claim 1, further comprising a diffuser arranged between the fourth beam splitter and the energy sensor.

10. An excimer laser apparatus comprising:
an oscillator configured to oscillate a laser beam; and an energy measuring apparatus according to claim 1.

11. An energy measuring apparatus for measuring energy of a laser beam output from a laser oscillator, the energy measuring apparatus comprising:
a first beam splitter arranged at a first incident angle on a first optical path of the laser beam output from the laser oscillator, and configured to reflect part of the laser beam passing through the first optical path to create a second optical path;
a second beam splitter arranged at a second incident angle on the second optical path, and configured to reflect part of the laser beam passing through the second optical path to create a third optical path;
a third beam splitter arranged at a third incident angle on the third optical path, and configured to reflect part of the laser beam passing through the third optical path to create a fourth optical path;
a fourth beam splitter arranged at a fourth incident angle on the fourth optical path, and configured to reflect part of the laser beam passing through the fourth optical path to create a fifth optical path; and
an energy sensor arranged on the fifth optical path or an optical path posterior to the fifth optical path,
the first incident angle being equal to the fourth incident angle,
the second incident angle being equal to the third incident angle,
a first incident plane of the first beam splitter and a fourth incident plane of the fourth beam splitter being parallel to a first plane,
a second incident plane of the second beam splitter and a third incident plane of the third beam splitter being on a second plane perpendicular to the first plane,
the first beam splitter folding the first optical path in a first direction on the first incident plane to create the second optical path,
the second beam splitter folding the second optical path in a second direction on the second plane to create the third optical path,
the third beam splitter folding the third optical path in the second direction on the second plane to create the fourth optical path,
the fourth beam splitter folding the fourth optical path in a direction opposite to the first direction on the fourth incident plane to create the fifth optical path.

12. The energy measuring apparatus according to claim 11, wherein the first beam splitter, the second beam splitter, the third beam splitter, and the fourth beam splitter are uncoated beam splitters.

13. The energy measuring apparatus according to claim 11, wherein the first beam splitter, the second beam splitter, the third beam splitter, and the fourth beam splitter are made of a same material.

14. The energy measuring apparatus according to claim 13, wherein the same material is calcium fluoride.

15. The energy measuring apparatus according to claim 11, wherein the first incident angle, the second incident angle, the third incident angle, and the fourth incident angle are equal.

16. The energy measuring apparatus according to claim 15, wherein the first incident angle, the second incident angle, the third incident angle, and the fourth incident angle are 45 degrees.

17. The energy measuring apparatus according to claim 11, wherein the first beam splitter is arranged to reflect, as a P-polarized beam, a largest polarization component among polarization components of the laser beam output from the laser oscillator.

18. The energy measuring apparatus according to claim 11, further comprising a lens arranged between the fourth beam splitter and the energy sensor.

19. The energy measuring apparatus according to claim 11, further comprising a diffuser arranged between the fourth beam splitter and the energy sensor.

20. An excimer laser apparatus comprising:
an oscillator configured to oscillate a laser beam; and an energy measuring apparatus according to claim 11.

* * * * *